(12) United States Patent
Boggarapu et al.

(10) Patent No.: US 12,333,485 B2
(45) Date of Patent: *Jun. 17, 2025

(54) OMNI-CHANNEL MULTI-LEVEL DEMAND PRIORITIZATION AND ALLOCATION

(71) Applicant: Blue Yonder Group, Inc., Scottsdale, AZ (US)

(72) Inventors: Maruthy Boggarapu, Hyderabad (IN); Pankaj Kumar, Hyderabad (IN); Shankar Lakkaraju, Hyderabad (IN); Rajeev Vasudev, Hyderabad (IN); Samson Sudhahar, Hyderabad (IN); Chaitanya Lella, Hyderabad (IN); Venu Gurram, Hyderabad (IN); Sudhakar Jayapal, Hyderabad (IN); Lalitha Namburi, Hyderabad (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 604 days.

This patent is subject to a terminal disclaimer.

(21) Appl. No.: 16/420,570

(22) Filed: May 23, 2019

(65) Prior Publication Data
US 2019/0303849 A1 Oct. 3, 2019

Related U.S. Application Data

(63) Continuation-in-part of application No. 16/273,934, filed on Feb. 12, 2019, now abandoned.
(Continued)

(51) Int. Cl.
G06Q 10/087 (2023.01)
G06Q 10/0835 (2023.01)
G06Q 30/0204 (2023.01)

(52) U.S. Cl.
CPC ....... *G06Q 10/087* (2013.01); *G06Q 10/0835* (2013.01); *G06Q 30/0205* (2013.01)

(58) Field of Classification Search
CPC ............ G06Q 10/0835; G06Q 10/087; G06Q 30/0205
See application file for complete search history.

(56) References Cited

U.S. PATENT DOCUMENTS 7,058,587 B1 * 6/2006 Horne .................... G06Q 50/04
705/7.22
7,668,743 B2 * 2/2010 Kaneko ............ G06Q 10/06375
705/7.29

(Continued)

*Primary Examiner* — Renae Feacher
(74) *Attorney, Agent, or Firm* — Spencer Fane LLP; Steven J. Laureanti

(57) ABSTRACT

A system and method are multi-level replenishment planning with independent channel demand prioritization that initiates production of a product by a first supply chain entity that receives orders for the product from a second supply chain entity and supplies the product to a third supply chain entity that receives orders for the product from a fourth supply chain entity. Embodiments further disclose calculating the supply of the product for the first supply chain entity for a supply allocation duration time period, receiving demand orders high priority demand orders from the fourth supply chain entity, allocating supplies within the supply allocation duration time period to firm plan arrivals based on a location priority and a demand date, and generating a shipment recommendation for each allocated supply that meets a firmed planned arrival.

20 Claims, 4 Drawing Sheets

Related U.S. Application Data

(60) Provisional application No. 62/652,261, filed on Apr. 3, 2018.

(56) References Cited

U.S. PATENT DOCUMENTS

| | | | | |
|---|---|---|---|---|
| 8,165,904 | B2* | 4/2012 | Srinivasan | G06Q 10/087 705/7.11 |
| 9,779,381 | B1* | 10/2017 | Konanur | G06Q 20/203 |
| 10,121,112 | B1* | 11/2018 | Vasquez, Jr. | G06Q 10/06313 |
| 10,949,796 | B1* | 3/2021 | Tsou | G06Q 10/087 |
| 2002/0178092 | A1* | 11/2002 | Hayes | G06Q 20/203 705/28 |
| 2002/0188499 | A1* | 12/2002 | Jenkins | G06Q 10/087 705/28 |
| 2003/0074250 | A1* | 4/2003 | Burk | G06Q 10/087 705/28 |
| 2007/0239299 | A1* | 10/2007 | Milne | G06Q 10/06 700/106 |
| 2008/0275795 | A1* | 11/2008 | Murugan | G06Q 30/08 705/28 |
| 2013/0211870 | A1* | 8/2013 | Lawson | H04L 43/14 705/7.25 |
| 2014/0122180 | A1* | 5/2014 | Chan | G06Q 30/0202 705/7.31 |
| 2015/0095091 | A1* | 4/2015 | Kamdar | G06Q 10/087 705/7.25 |
| 2018/0025316 | A1* | 1/2018 | Konanur | G06Q 20/203 705/28 |
| 2018/0204172 | A1* | 7/2018 | Sabuz | G06Q 10/0835 |
| 2019/0066238 | A1* | 2/2019 | Notani | G06Q 30/0202 |
| 2019/0259043 | A1* | 8/2019 | Koneri | G06Q 10/087 |

* cited by examiner

OMNI-CHANNEL MULTI-LEVEL DEMAND PRIORITIZATION AND ALLOCATION

CROSS-REFERENCE TO RELATED APPLICATIONS

This application is a continuation-in-part of U.S. patent application Ser. No. 16/273,934, filed on Feb. 12, 2019, entitled "Segmented Safety Stock and Omni-Channel Multi-Level Demand Prioritization and Allocation," which claims the benefit under 35 U.S.C. § 119(e) to U.S. Provisional Application No. 62/652,261, filed Apr. 3, 2018, entitled "Segmented Safety Stock and Omni-Channel Multi-Level Demand Prioritization and Allocation." U.S. patent application Ser. No. 16/273,934 and U.S. Provisional Application No. 62/652,261 are assigned to the assignee of the present application. The subject matter disclosed in U.S. patent application Ser. No. 16/273,934 and U.S. Provisional Application No. 62/652,261 is hereby incorporated by reference into the present disclosure as if fully set forth herein.

TECHNICAL FIELD

The present disclosure relates generally to supply chain planning and specifically to a system and method of multi-level supply chain planning.

BACKGROUND

Many companies struggle to differentiate service to customers for their products in a consistent way. Standard supply chain processes, combined with a multitude of customers and products, make it difficult to deliver special services without workarounds in order-taking and planning systems. Determining how deep and granular service differentiation should be is difficult because having too much leads to complexity, while having too little does not differentiate a service offering sufficiently. These drawbacks are undesirable.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
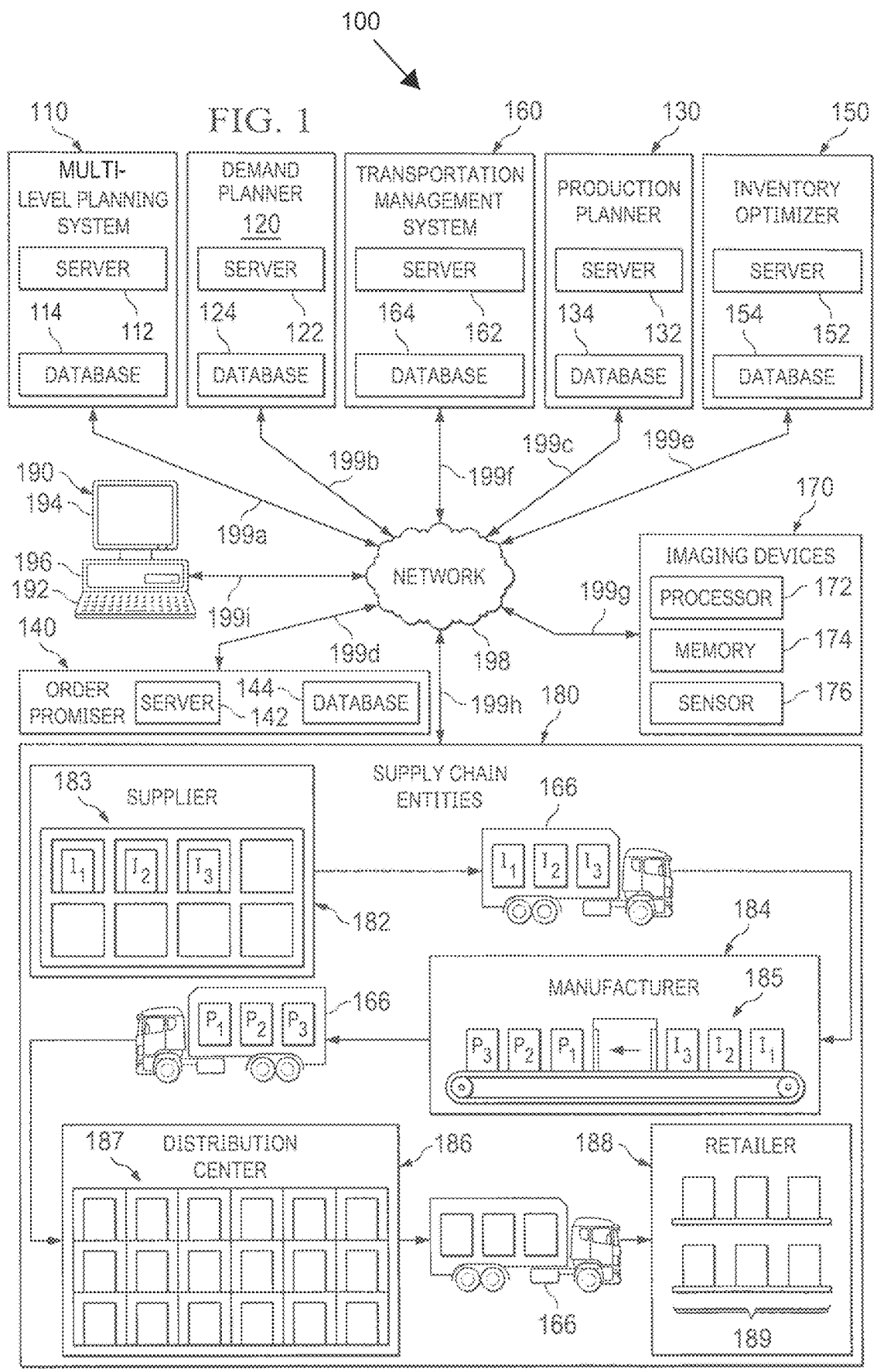
FIG. 1 illustrates an exemplary supply chain network, in accordance with an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In general, a replenishment system considers demand at a Stock Keeping Unit (SKU) level and allocates the supply by suggesting the movement of goods from one point to the other or holding the supply at any of the nodes based on the business requirement set in the system. When differentiated services cannot be offered at a customer level, supply chain planners will overstock inventory at a SKU-level to meet their service level goals. A better safety stock would be determined at a customer level since the service levels could change from one customer to another. Because planning happens at the SKU level, supplies are overstocked to achieve the desired service levels, or understocked at the cost of being unable to meet a service level goal.

According to embodiments, embodiments of the current disclosure comprise resolving priority conflicts across a multi-level supply chain, defining clusters of customers and products, and determining particular implementations of demand planning, supply and distribution planning, inventory management, allocation planning, and order fulfilment. According to embodiments, customers and products may be classified to directly configure service priorities in supply chain planning and execution modules.

As described in more detail below, embodiments in accordance with the current disclosure manage inventory parameters and calculate customer-specific safety stock. The customer-specific safety stock can be based on the service level, the service type, and the selling pattern of each customer. The customer specific service level is set and maintained while serving from the same inventory location and inventory pool. SKU-level safety stock needs is the sum of individual customer specific safety Stock needs that have been calculated based on the customers parameters. Additionally, safety stock may be based on customer-type, group of customers with the same or similar parameters and safety Stock calculated for them and the SKU levels total SKU based safety Stock value would be sum of that group and any other individual customers.

Customer-level planning facilitates configuration of allocation priorities, for forecast, order and safety stock at a customer segment level. Inventory positioning recommendations are based on demand priorities at a customer segment level. Transfer order recommendations at each level are based on one or more of: (1) all customers' forecast, orders, and safety stock needs from downstream nodes; (2) prioritization rules at customer-and-demand-type level drives which customers' demands to meet in a limited stock situation; and (3) minimizing late orders by not reserving current on-hand for a future priority demand when it can be met on-time by a future shipment.

Customer level planning provides linkages, across the supply chain network between supply and individual customer's demands which are used to intelligently produce or transport supply between various levels of the supply chain to meet a demand. Supply and demand linkages are based on a priority derived from configured customer segmentation and prioritization rules. Customer level visibility provides detailed information of the destination of production orders and transfer orders, including the customer and demand-type information associated with the production quantity or a suggested/actual shipment for a forecast, order, or safety stock demand.

Based on the customer-level visibility and supply/demand linkages, the system provides the exact details of the customer level needs at any node to make the transfer decisions for the supply. Accordingly, the supplies for one customer may be allocated directly from a regional distribution center to a destination facility, before making shipments for any other demand. The replenishment signals for upstream production or purchasing are now more accurate and at least partially based on one or more customer-level safety stocks. Inventory is now positioned at the right time and place to improve differentiated service levels and priorities at a customer-level. The system provides information for prioritization of planned orders, for production in a limited capacity environment, with visibility into associated planned order impacts. In addition, the system provides information for downstream order promising, on what customers' orders can be promised, with visibility into associated on-hand and shipment stock reservations.

FIG. 1 illustrates exemplary supply chain network 100, in accordance with an embodiment. Supply chain network 100 comprises multi-level planning system 110, demand planner 120, production planner 130, order promiser 140, inventory optimizer 150, transportation management system 160, one or more imaging devices 170, one or more supply chain entities 180, computer 190, network 198, and one or more communication links 199a-i. Although a single multi-level planning system 110, a single demand planner 120, a single production planner 130, a single order promiser 140, a single inventory optimizer 150, a single transportation management system 160, one or more imaging devices 170, one or more supply chain entities 180, a single computer 190, and a single network 198 are shown and described, embodiments contemplate any number of multi-level planning systems, demand planners, production planners, order promisers, inventory optimizers, transportation management systems, imaging devices, supply chain entities, computers, and networks, according to particular needs.

In one embodiment, multi-level planning system 110 comprises server 112 and database 114. According to embodiments, server 112 comprises one or more modules for forecasting, replenishment planning, safety stock calculation, and supply and demand allocation at the channel-level. Channels, which may be referred to as a sales channels, include platforms (Online, Brick and Mortar, e-commerce, Retail, etc.) through which companies sell products. Channels may also refer to individual customers (Customer A, Customer B, Customer C, etc.), or groups of customers (Regular, Growth, Strategic, etc.), as described in more detail below. Server 112 stores and retrieves customer-level planning data from database 114 or from one or more locations in supply chain network 100.

Multi-level planning system 110 may receive a demand forecast from demand planner 120 and generate supply and demand links. Supply and demand links are used for customer-level planning such as, for example, production planner 130 calculates production plans based on prioritization of individual channels, transportation management system 180 transports items to replace stock reserved for a future priority demand used to satisfy a current lower priority demand; and order promiser 160 releases safety stock to customer orders based on differences at a SKU-demand group level; and pegging supply and demand in a multi-level supply chain network based on individual customer service level targets.

According to embodiments, demand planner 120 comprises server 122 and database 124. Server 122 comprises one or more modules that calculate demand forecasts for one or more items. Server 122 stores and demand planning data from database 124 or from one or more locations in supply chain network 100. Database 124 may store current and historical demand forecasts, safety stock targets, customer orders, inventory levels, and the like. Demand planner 120 may generate a forecast for one or more future time periods, such as one or more years, months, weeks, days, or other like time periods. Demand planner 120 may transmit for use to one or more other processes for determining, for example, appropriate inventory levels, and balance of demand and supply for both tactical and operational supply planning horizons. Demand planner 120 may also receive customer orders from an order entry system and are electronically communicated to demand planner 120. The customer orders may be used to create a demand plan comprising netted forecasts and orders.

According to embodiments, production planner 130, comprises server 132 and database 134. Server 132 comprises one or more modules that calculate production plans to create the details of a production plan along one or more production lines. Server 132 stores and retrieves production plan data from database 134 or from one or more locations in supply chain network 100. Database 134 comprises current and historical production plans. Production plans may be based on market demand, production constraints, channel priority, and the like. In situations where production fails to meet a forecasted volume, channels with the highest priority will be the last channels shorted.

As described in more detail below, order promiser 140 comprises server 142 and database 144. Server 142 comprises one or more modules for promising and reserving items based on strategic priorities, including customers, channels or geographic regions. Server 142 stores and retrieves order promising data from database 142 or from one or more locations in supply chain network 100. Database 144 comprises received orders, calculated due dates, order promises, and the like. According to embodiments, order promiser 140 receives a customer order, identifies a supply to meet the customer order in available inventory, checks incoming orders against available supply, and generates due dates for order promises. According to embodiments, the due date may be calculated at least partially on, for example, lead times between customers and supply chain entities 180, whether the customer may receive direct shipment, and the like.

As described in more detail below, inventory optimizer 150 comprises server 152 and database 154. Server 152 comprises one or more modules that assists fulfillment planning and deployment by calculating needs, deploying inventory down, and tracing it back to the calculated needs. Server 152 is configured to receive and transmit item data, including item identifiers, pricing data, attribute data, inventory levels, and other like data about one or more items at one or more locations in the supply chain network 100. Server 152 stores and retrieves inventory data from database 154 or from one or more locations in supply chain network 100. As described in more detail below, inventory optimizer 150 monitors the inventory of one or more items and adjusts product mix ratios, inventory levels at various stocking points, production of products of manufacturing equipment, proportional or alternative sourcing of one or more supply chain entities 180, and the configuration and quantity of packaging and shipping of products at least partially based on channel-level prioritization, calculated safety stocks, shipment recommendations, supply and demand links, current or forecasted inventory levels, inventory policies, and/or one or more other factors described herein.

As described in more detail below, transportation management system 160 comprises server 162 and database 164. According to embodiments, transportation management system 160 directs one or more transportation vehicles 166 to ship one or more items between one or more supply chain entities 180 according one or more segmentations, prioritizations, hierarchies, inventory policies, and/or target service levels. Transportation vehicles 166 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with multi-level planning system 110, demand planner 120, production planner 130, order promiser 140, inventory optimizer 150, transportation management system 160, one or more imaging devices 170, and/or one or more supply chain entities 180 to identify the location of transportation vehicle 166 and the location of any inventory or shipment located on transportation vehicle 166. In addition, the number of items shipped by transportation vehicles 166 in transportation network may be at least partially based on the number of items currently in stock at one or more supply chain entities 180, the number of items currently in transit in the transportation network, forecasted demand, a supply chain disruption, or the like.

One or more imaging devices 170 comprise one or more processors 172, memory 174, one or more sensors 176, and may include any suitable input device, output device, fixed or removable computer-readable storage media, or the like. According to embodiments, one or more imaging devices 170 comprise an electronic device such as, for example, a mobile handheld electronic device such as, for example, a smartphone, a tablet computer, a wireless communication device, and/or one or more networked electronic devices configured to image items using sensor 126 and transmit product images to one or more databases.

Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information. One or more imaging devices 170 may generate a mapping of one or more items in the supply chain network 100 by scanning an identifier or object associated with an item and identifying the item based, at least in part, on the scan. This may include, for example, a stationary scanner located at one or more supply chain entities 180 that scans items as the items pass near the scanner such as, for example, a point of sale system at one or more retailers 189 that records transaction data and associates the transaction data with product data 210, including, for example, associating customer identity and details, store identity and details (including, for example, location), market details, time details, price details, discount details, and the like. Embodiments include, for example, a scanner located at one or more stocking locations of one or more supply chain entities 180 that automatically identifies when an item is received into or removed from one or more stocking locations.

One or more sensors 176 of one or more imaging devices 170 may comprise an imaging sensor, such as, a camera, scanner, electronic eye, photodiode, charged coupled device (CCD), or any other electronic component that detects visual characteristics (such as color, shape, size, or the like) of objects. In addition, or as an alternative, one or more sensors 176 may comprise a radio receiver and/or transmitter configured to read an electronic tag, such as, for example, an RFID tag. Additionally, one or more sensors 176 of one or more imaging devices 170 may be located at one or more locations local to, or remote from, the one or more imaging devices 170, including, for example, one or more sensors 176 integrated into one or more imaging devices 170 or one or more sensors 176 remotely located from, but communicatively coupled with, one or more imaging devices 170. According to some embodiments, one or more sensors 176 may be configured to communicate directly or indirectly with multi-level planning system 110, demand planner 120, production planner 130, order promiser 140, inventory optimizer 150, transportation management system 160, one or more imaging devices 170, one or more supply chain entities 180, one or more computers 190 and/or network 198 using one or more communication links 199a-199i.

As shown in FIG. 1, supply chain network 100 comprising multi-level planning system 110, demand planner 120, production planner 130, order promiser 140, inventory optimizer 150, transportation management system 160, one or more imaging devices 170, and one or more supply chain entities 180 may operate on one or more computers 190 that are integral to or separate from the hardware and/or software that support multi-level planning system 110, demand planner 120, production planner 130, order promiser 140, inventory optimizer 150, transportation management system 160, one or more imaging devices 170, and one or more supply chain entities 180. Computers 190 may include any suitable input device 192, such as a keypad, mouse, touch screen, microphone, or other device to input information. Output device 194 may convey information associated with the operation of supply chain network 100, including digital or analog data, visual information, or audio information. Computer 190 may include fixed or removable computer-readable storage media, including a non-transitory computer readable medium, magnetic computer disks, flash drives, CD-ROM, in-memory device or other suitable media to receive output from and provide input to supply chain network 100.

Computer 190 may include one or more processors 196 and associated memory to execute instructions and manipulate information according to the operation of supply chain network 100 and any of the methods described herein. In addition, or as an alternative, embodiments contemplate executing the instructions on computer 190 that cause computer 190 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from multi-level planning system 110, demand planner 120, production planner 130, order promiser 140, inventory optimizer 150, transportation management system 160, one or more imaging devices 170, and one or more supply chain entities 180. In addition, each of the one or more computers 190 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated multi-level planning system 110, demand planner 120, production planner 130, order promiser 140, inventory optimizer 150, transportation management system 160, one or more imaging devices 170, and one or more supply chain entities 180. These one or more users may include, for example, a "manager" or a "planner" handling customer-level planning and/or one or more related tasks within system 100. In addition, or as an alternative, these one or more users within the system may include, for example, one or more computers 190 programmed to autonomously handle, among other things, one or more supply chain processes such as demand planning, supply and distribution planning, inventory management, allocation planning, order fulfilment, and adjustment of manufacturing and inventory levels at various stocking points and distribution centers 166, and/or one or more related tasks within the supply chain network.

One or more supply chain entities 180 represent one or more supply chain networks, including one or more enterprises, such as, for example networks of one or more suppliers 182, manufacturers 184, distribution centers 186, retailers 188 (including brick and mortar and online stores), customers, and/or the like. Suppliers 182 may be any suitable entity that offers to sell or otherwise provides one or more items (i.e., materials, components, or products) to one or more manufacturers 184. Suppliers 182 may comprise automated distribution systems 183 that automatically transport products to one or more manufacturers 184 according to one or more segmentations, channel-level prioritizations, calculated safety-stocks, shipment recommendations, supply and demand links, hierarchies, inventory policies, and/or target service levels and in response to and at least partially based on current or forecasted inventory of one or more items at one or more supply chain entities 180, items currently in transit in transportation network, forecasted demand, a supply chain disruption, and/or one or more other factors described herein.

Manufacturers 184 may be any suitable entity that manufactures at least one product. Manufacturers 184 may use one or more items during the manufacturing process to produce any manufactured, fabricated, assembled, or otherwise processed item, material, component, good, or product. In one embodiment, a product represents an item ready to be supplied to, for example, one or more supply chain entities 180 in supply chain network 100, such as retailers 188, an item that needs further processing, or any other item. Manufacturers 184 may, for example, produce and sell a product to suppliers 182, other manufacturers 184, distribution centers 186, retailers 188, a customer, or any other suitable person or entity. Manufacturers 184 may comprise automated robotic production machinery 185 that produce products according to one or more segmentations, channel-level prioritizations, calculated safety-stocks, shipment recommendations, supply and demand links, hierarchies, inventory policies, and/or target service levels and in response to and at least partially based on current or forecasted inventory of one or more items at one or more supply chain entities 180, items currently in transit in transportation network, forecasted demand, a supply chain disruption, and/or one or more other factors described herein.

Distribution centers 186 may be any suitable entity that offers to store or otherwise distribute at least one product to one or more retailers 188 and/or customers. Distribution centers 186 may, for example, receive a product from a first one or more supply chain entities 180 in supply chain network 100 and store and transport the product for a second one or more supply chain entities 180. Distribution centers 186 may comprise automated warehousing systems 187 that automatically remove products from and place products into inventory according to one or more segmentations, channel-level prioritizations, calculated safety-stocks, shipment recommendations, supply and demand links, hierarchies, inventory policies, and/or target service levels and in response to and at least partially based on current or forecasted inventory of one or more items at one or more supply chain entities 180, items currently in transit in transportation network, forecasted demand, a supply chain disruption, and/or one or more other factors described herein.

Retailers 188 may be any suitable entity that obtains one or more products to sell to one or more customers. Retailers 188 may comprise any online or brick-and-mortar store, including stores with shelving systems 189. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 188 based on computer-generated instructions or automatically by machinery to place products in a desired location in retailers 188 according to channel-level prioritizations, calculated safety-stocks, shipment recommendations, supply and demand links, hierarchies, inventory policies, and/or target service levels and in response to and at least partially based on current or forecasted inventory of one or more items at one or more supply chain entities 180, items currently in transit in transportation network, forecasted demand, a supply chain disruption, and/or one or more other factors described herein.

Although one or more supply chain entities 180 are shown and described as separate and distinct entities, the same entity may simultaneously act as any one of the one or more supply chain entities 180. For example, one or more supply chain entities 180 acting as a manufacturer can produce a product, and the same one or more supply chain entities 180 can act as a supplier to supply an item to itself or another one or more supply chain entities 180. Although one example of a supply chain network 100 is shown and described, embodiments contemplate any configuration of supply chain network 100, without departing from the scope described herein.

In one embodiment, multi-level planning system 110 may be coupled with network 198 using communications link 199a, which may be any wireline, wireless, or other link suitable to support data communications between multi-level planning system 110 and network 198 during operation of supply chain network 100. Demand planner 120 may be coupled with network 198 using communications link 199b, which may be any wireline, wireless, or other link suitable to support data communications between demand planer 120 and network 198 during operation of supply chain network 100. Production planner 130 may be coupled with network 198 using communications link 199c, which may be any wireline, wireless, or other link suitable to support data communications between production planner 130 and network 198 during operation of supply chain network 100. Order promiser 140 may be coupled with network 198 using communications link 199*d*, which may be any wireline, wireless, or other link suitable to support data communications between order promiser 140 and network 198 during operation of supply chain network 100. Inventory optimizer 150 may be coupled with network 198 using communications link 199*e*, which may be any wireline, wireless, or other link suitable to support data communications between inventory optimizer 150 and network 198 during operation of supply chain network 100. Transportation management system 160 may be coupled with network 198 using communications link 199*f*, which may be any wireline, wireless, or other link suitable to support data communications between transportation management system 160 and network 198 during operation of supply chain network 100. One or more imaging devices 170 may be coupled with network 198 using communications link 199*g*, which may be any wireline, wireless, or other link suitable to support data communications between one or more imaging devices 170 and network 198 during operation of supply chain network 100. One or more supply chain entities 180 may be coupled with network 198 using communications link 199*h*, which may be any wireline, wireless, or other link suitable to support data communications between one or more supply chain entities 180 and network 198 during operation of supply chain network 100. Computer 190 may be coupled with network 198 using communications link 199*i*, which may be any wireline, wireless, or other link suitable to support data communications between computer 190 and network 198 during operation of supply chain network 100.

Although communication links 190*a*-190*i* are shown as generally coupling multi-level planning system 110, demand planner 120, production planner 130, order promiser 140, inventory optimizer 150, transportation management system 160, one or more imaging devices 170, one or more supply chain entities 180, and computer 190 to network 198, any of multi-level planning system 110, demand planner 120, production planner 130, order promiser 140, inventory optimizer 150, transportation management system 160, one or more imaging devices 170, one or more supply chain entities 180, and computer 190 may communicate directly with each other, according to particular needs.

In another embodiment, network 198 includes the Internet and any appropriate local area networks (LANs), metropolitan area networks (MANs), or wide area networks (WANs) multi-level planning system 110, demand planner 120, production planner 130, order promiser 140, inventory optimizer 150, transportation management system 160, one or more imaging devices 170, one or more supply chain entities 180, and computer 190. For example, data may be maintained locally to, or externally of multi-level planning system 110, demand planner 120, production planner 130, order promiser 140, inventory optimizer 150, transportation management system 160, one or more imaging devices 170, one or more supply chain entities 180, and computer 190 and made available to one or more associated users of multi-level planning system 110, demand planner 120, production planner 130, order promiser 140, inventory optimizer 150, transportation management system 160, one or more imaging devices 170, one or more supply chain entities 180, and computer 190 using network 198 or in any other appropriate manner. For example, data may be maintained in a cloud database at one or more locations external to multi-level planning system 110, demand planner 120, production planner 130, order promiser 140, inventory optimizer 150, transportation management system 160, one or more imaging devices 170, one or more supply chain entities 180, and computer 190 and made available to one or more associated users of multi-level planning system 110, demand planner 120, production planner 130, order promiser 140, inventory optimizer 150, transportation management system 160, one or more imaging devices 170, one or more supply chain entities 180, and computer 190 using the cloud or in any other appropriate manner. Those skilled in the art will recognize that the complete structure and operation of network 198 and other components within supply chain network 100 are not depicted or described. Embodiments may be employed in conjunction with known communications networks and other components.

One or more computers 190 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 180, and the configuration and quantity of packaging and shipping of items according to channel-level prioritizations, calculated safety-stocks, shipment recommendations, supply and demand links, hierarchies, inventory policies, and/or target service levels and in response to and at least partially based on current or forecasted inventory of one or more items at one or more supply chain entities 180, items currently in transit in transportation network, forecasted demand, a supply chain disruption, and/or one or more other factors described herein.

In accordance with the principles of embodiments described herein, multi-level planning system 110 may generate one or more channel-level prioritizations, calculated safety-stocks, shipment recommendations, supply and demand links, hierarchies, inventory policies, and/or target service level that determine the routing, storage, and handling for the inventory of the one or more supply chain entities in the supply chain network. Additionally, multi-level planning system 110, demand planner 120, production planner 130, order promiser 140, inventory optimizer 150, transportation management system 160, one or more imaging devices 170, one or more supply chain entities 180, and/or computer 190 may comprise a server and database comprising one or more modules and related data to perform one or more planning and execution processes including demand planning processes, supply planning processes, demand fulfillment processes, an order entry system, comprising an order entry process, an allocation-planning order promising engine, and the like, as described in more detail below. Computers 190 may also receive, from the automated machinery, a current location of the identified item. Based on the identification of the item, computers 190 may also identify (or alternatively generate) a first mapping in the database system, where the first mapping is associated with the current location of the item. Computers 190 may also identify a second mapping in the database system, where the second mapping is associated with a past location of the identified item. Computers 190 may also compare the first mapping and the second mapping to determine if the current location of the identified item in the first mapping is different than the past location of the identified item in the second mapping. Computers 190 may then send instructions to the automated machinery based, as least in part, on one or more differences between the first mapping and the second mapping such as, for example, to locate item to add to or remove from an inventory of or shipment for one or more supply chain entities 180.

Figure 2:
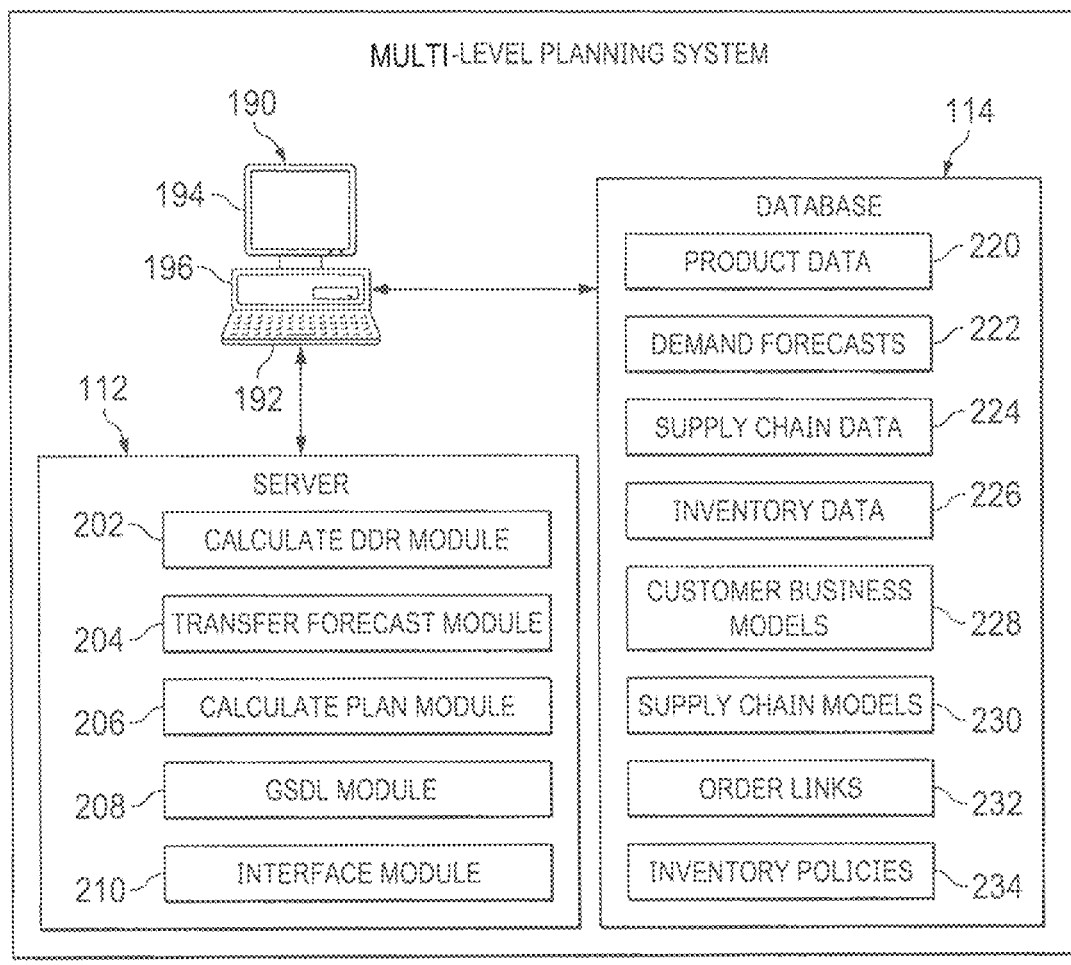
FIG. 2 illustrates the multi-level planning system of FIG. 1 in greater detail, in accordance with an embodiment.

FIG. 2 illustrates multi-level planning system 110 of FIG. 1 in greater detail, in accordance with an embodiment. As discussed above, multi-level planning system 110 may comprise one or more computers 190 at one or more locations including associated input devices 192, output devices 194, non-transitory computer-readable storage media, processors 196, memory, or other components for receiving, processing, storing, and communicating information according to the operation of supply chain network 100. Additionally, multi-level planning system 110 comprises server 112 and database 114. Although multi-level planning system 110 is shown as comprising a single computer 190, a single server 112, and a single database 114, embodiments contemplate any suitable number of computers, servers, or databases internal to or externally coupled with multi-level planning system 110.

According to embodiments, server 112 of multi-level planning system 110 may comprise calculate DDR (Dynamic Demand Response) module 202, transfer forecast module 204, calculate plan module 206, GSDL (Generate Supply and Demand Links) module 208, and interface engine 212. Although server 112 is shown and described as comprising a single calculate DDR module 202, a single transfer forecast module 204, a single calculate plan module 206, a single GSDL module 208, and a single interface engine 212, embodiments contemplate any suitable number or combination of these located at one or more locations, local to, or remote from multi-level planning system 110, such as on multiple servers or computers at any location in supply chain network 100.

Database 114 of multi-level planning system 110 may comprise one or more databases or other data storage arrangement at one or more locations, local to, or remote from, server 112. Database 114 comprises, for example, product data 220, demand forecasts 222, supply chain data 224, inventory data 226, customer business models 228, supply chain models 230, order links 232, and inventory policies 234. Although, database 114 is shown and described as comprising product data 220, demand forecasts 222, supply chain data 224, inventory data 226, customer business models 228, supply chain models 230, order links 232, and inventory policies 234, embodiments contemplate any suitable number or combination of these, located at one or more locations, local to, or remote from, multi-level planning system 110 according to particular needs.

Calculate DDR module 202 of multi-level planning system 110 calculates daily demand allocation, proration, consumption, and adjustment at the Demand Forecasting Unit (DFU) level. According to embodiments, Calculate DDR module 202 receives a monthly or weekly forecast at the DFU-level from demand planner 120, which may be readjusted based on market, territories, customers, or groups of customers prior to receipt by calculate DDR module 202. For example, a customized process may generate weekly readjusted base forecasts from a demand forecast of demand planner 120 which is received as an input to DDR module 202.

Transfer forecast module 204 of multi-level planning system 110 populates a forecast in DFU-to-SKU Conversion Table. According to embodiments, transfer forecast module 204 transfers the long-term forecast at the DFU-level to the channel level. As described above, the calculate DDR module 202 generates a weekly forecast in daily buckets and forecast netting happens within the DDR Period Duration.

Calculate plan module 206 of multi-level planning system 110 generates planned arrivals and orders at the SKU-level based on the aggregated adjusted forecast, customer orders, and safety stock. Traditionally, when planning is done at the SKU-level, there is no visibility of channels within the SKU. In some embodiments, adjusted allocated total forecast, customer orders, and calculated safety stock resolved at channel-level granularity are aggregated at a SKU level. Calculate plan module 206 generates the planned arrivals and orders at the SKU-level to meet demand requirements of different channels by respecting SKU planning parameters and constraints. Apart from the computation of the SKU-Channel level adjusted forecast, Customer Orders and safety stock, there is no change in the replenishment planning logic.

GSDL module 208 of multi-level planning system 110 creates Order Links and Independent Demand Links for the Deployment Channel Prioritizations. As described above, calculate plan module 206 may publish forecast and safety stocks calculations along with generated priorities. As described in more detail below, GSDL module 208 generates a multi-level visibility of a supply for a demand across the network based on the independent priority of the demand at the originating location. For each independent demand, a pegging feature gives visibility of which supply is allocated across the multi-level network. In Deployment pegging, pegging feature gives visibility of which supply is allocated for what demand across the multi-level network in a constrained supply situation. The demands are met either on-time, early or late based on the available supply situation. However, higher priority demands are fully met with constrained supply before lower priority demands.

Interface engine 212 of multi-level planning system 110 generates a user interface that provides for viewing Forecast and Customer Orders at the channel level for replenishment planning; forecast manipulation (proration, adjustment and consumption) at a DFU-level using DDR; calculating Safety Stock targets at the channel level to provide differentiated services among various customers; driving Supply allocation, which is used to position the inventory at the right node in the network, based on the demand prioritization of independent demands at the channel level; and viewing demand and supply links across the network at the channel level.

The various types of data stored in the database of multi-level planning system 110 will now be discussed.

Product data 220 of database 114 may comprise products identified by, for example, a product identifier (such as a Stock Keeping Unit (SKU), Universal Product Code (UPC) or the like), and one or more attributes and attribute types associated with the product ID. Product data 220 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Demand forecasts 222 of database 114 may indicate future expected demand based on, for example, any data relating to past sales, past demand, purchase data, promotions, events, or the like of one or more supply chain entities 180. Demand forecasts 230 may cover a time interval such as, for example, by the minute, hour, daily, weekly, monthly, quarterly, yearly, or any suitable time interval, including substantially in real time.

Supply chain data 224 may comprise any data of the one or more supply chain entities 180 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 180.

Inventory data 226 of database 114 may comprise any data relating to current or projected inventory quantities or states, order rules, or the like. For example, inventory data 226 may comprise the current level of inventory for each item at one or more stocking points across supply chain network 100. In addition, inventory data 226 may comprise order rules that describe one or more rules or limits on setting an inventory policy, including, but not limited to, a minimum order quantity, a maximum order quantity, a discount, and a step-size order quantity, and batch quantity rules. According to some embodiments, multi-level planning system 110 accesses and stores inventory data 226 in database 114, which may be used by multi-level planning system 110 to place orders, set inventory levels at one or more stocking points, initiate manufacturing of one or more components, or the like. In addition, or as an alternative, inventory data 226 may be updated by receiving current item quantities, mappings, or locations from an inventory system and/or transportation system 140.

Customer business models 228 comprise groups of customers, channels, and/or product concepts based on one or more customer attributes. As explained in more detail below, customer business models may comprise groups which share a particular set of customer attributes. These customer attributes may include, for example, ordering behavior, order pattern, lead time expectations, product or packaging adjustments, and unique or particular service requests. More particular examples of customer attributes include: having limited or no storage space, requesting one or more suppliers 182 to keep consignment inventory, selling products from a competitor, purchasing items ahead of season, and placing large orders.

Supply chain models 230 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 230 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Order Links 232 assess the impact of changes in the supply plans over the demand plans in Requirement (Unconstrained) and Deployment (Constrained) pegging. According to embodiments, order links 232 provides insights into the impact of short or late supply to a priority demand; the impact of a shortage of supply to one or more high priority customers; and the impact of adjusting scheduled firm supply plans.

Inventory policies 234 of database 114 may comprise any suitable inventory policy describing the reorder point and target quantity, or other inventory policy parameters that set rules for multi-level planning system 110 to manage and reorder inventory. Inventory policies 234 may be based on target service level, demand, cost, fill rate, or the like.

According to embodiment, inventory policies 234 comprise target service levels that ensure that a service level of one or more supply chain entities 180 is met with a certain probability. For example, one or more supply chain entities 180 may set a service level at 95%, meaning supply chain entities 180 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, multi-level planning system 110 may determine a replenishment order according to one or more replenishment rules, which, among other things, indicates to one or more supply chain entities 180 to determine or receive inventory to replace the depleted inventory.

In a multi-level network, multi-level planning system 110 does not account for needs at a customer-level during replenishment. Multi-level planning system 110 is challenged with inventory positioning at the best distribution center 187 and at the right time based on customer segmentation and priorities. Accordingly, embodiments of multi-level planning system 110 without independent demand logic (IDL) may fail to maintain the right level of inventory at various nodes in supply chain network 100, such as, for example, a manufacturing plant unable to respond to a shortage for a priority customer.

Customer-level visibility has challenges with determining the right item to manufacture, to minimize the impact on customer service, in a limited production capacity environment. At a manufacturing plant, where capacity is limited and which has multiple items to produce, the decision to manufacture any item is frequently based on a set of rules or priorities that lead to a shortage of priority items, leaving a production manager without a clear list of items that need to be produced for a particular customer's need and priorities.

Customer-level visibility additionally has challenges with determining time-phased available-to-promise (ATP) information, at a customer level, for promising against orders. As the priority demand information is not resolved at a customer level, often on-hand supply is promised for near-term demand of a lower-priority customer, which leads to the demand of a higher-priority (but later customer) becoming unpromised in the future.

As described in more detail below, multi-level planning system 110 prioritizes and allocates supplies to requirements at a channel level. According to one or more aspects, the following system and method also provide end-to-end visibility and map any demand in the system to the ultimate supply that is going to be used to satisfy that demand. Multi-level planning enables the enterprise to attain differentiated service goals to its customers, ensuring that supply allocation takes place by respecting the specifically targeted sales channels. Inventory requirements for a channel can change at any time, which requires protecting one channel's need from being consumed by another channel. Therefore, it is essential to provide a forecasting mechanism and plan replenishments targeting a specific channel. To provide differentiated services among various channels, all the business processes in a supply chain need to align with replenishment strategy and decision parameters to respect channel commitments. Channel-driven forecasting and replenishment can have a huge impact on profitability. In the business landscape, a sales channel, which may be referred to as simply a channel, can be defined as a platform (Online, Brick and Mortar, e-commerce, Retail, etc.) through which a company can sell its products or as an important customer (Customer A, Customer B, Customer C, etc.) or a group of customers (Regular, Growth, Strategic, etc.).

Figure 3:
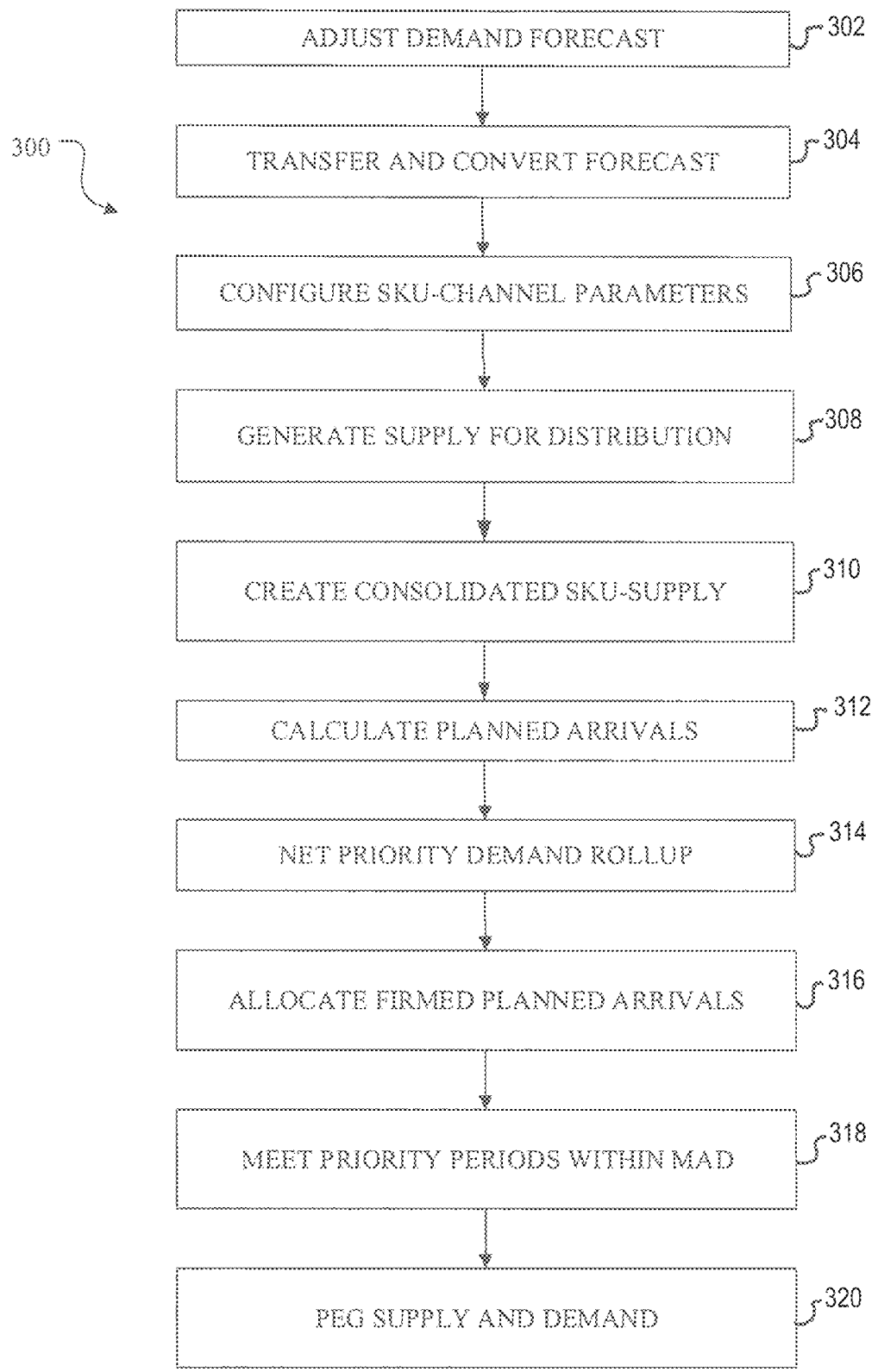
FIG. 3 illustrates an exemplary method of multi-level replenishment planning, in accordance with an embodiment.

FIG. 3 illustrates exemplary method 300 of customer-level replenishment planning comprising IDL, in accordance with an embodiment. Although actions of method 300 are described in a particular order, embodiments contemplate actions of method 300 performed in any suitable order or combination according to particular needs.

At action 302, calculate DDR module 202 performs forecast adjustment at the channel level for DFU. Calculate DDR module 202 adjusts a channel-level forecast (also referred to as forecast netting) by removing double-counted customer orders. Customer orders and shipments change on a daily basis. Calculate DDR module 202 reconciles the long-term channel-level forecast with customer orders on a daily basis to ensure dynamic response to changes in demand signals. The forecast adjustment process includes the most recent demand updates without overstating demand. This process is executed after a demand planning process and before a supply planning process. After demand planner 120 generates a monthly forecast at the DFU-level, multi-level planning system 110 disaggregates the monthly forecast to a weekly forecast and readjusts the forecast based on market, territories, customers, customer groups, and/or like demand groups.

At action 304, Calculate DDR module 202 transfers the adjusted allocated total forecast of a SKU-Channel to fulfillment based on a DFU-to-SKU conversion (which may be expressed as a DFU-to-SKU conversion rule) after proration, consumption, and adjustment.

At action 306, SKU-channel parameters are used to configure the SKU-channel level, planning and safety stock parameters for the multi-level replenishment. According to some embodiments, replenishment planning provides for adjusted forecast, visibility of customer orders and calculated safety stock at the Channel level and aggregated at the SKU level.

At action 308, supply generation in distribution requirement planning happens at the SKU level, accounting the Channel-Level Forecast, Customer Orders, and safety stock.

At action 310, consolidated SKU supply is created respecting all the related SKU planning parameters. At action 312, planned arrivals are calculated and generated by calculate plan module 206. At action 314, multi-level planning system 110 performs a net priority demand rollup action by calculating the unmet priority demands at each node and rolling up priority demand to each upstream node to propagate only lower priority unmet demands that would compete with supply from a source and with net demands from other destinations.

At action 316, supplies within supply allocation duration time period are first allocated to firm plan arrivals based on location priority and demand date for each SKU being processed. According to embodiments, after a net priority demand roll up, each SKU may be associated with a list of prioritized unmet demands. Multi-level planning system 110 may then start processing from the most upstream locations, followed by intermediate downstream locations. Shipment recommendations may then be created when a supply is allocated and a firm planned arrival is met.

At action 318, after reserving supplies for a hold back quantity and outbound in-transits and allocating against firm planned arrivals, the priority demands within minimum allocation duration time period are met. The priority demands are sorted based on independent demand priority, location priority, demand type, and requirement dates. Supply may then be allocated in order of priority. According to one embodiment, supplies, to meet a priority demand, are chosen in the following order: nearest on-time supply, nearest late supply that reduces lateness. In case of scarce source supply, supply may be fair-shared for demands having the same demand priority, location priority and need dates. When safety stock is processed as higher priority demand, supply allocation for the higher priority safety stock may meet any lower priority demands on or after the safety stock release date.

When safety stock is processed as lowest priority demand and the safety stock release also meets a later higher priority demand, supply may be allocated on the later higher priority demand date when the supply is limited. However, when there is ample source supply which could also meet a lower-priority safety stock, then allocation is done against a safety stock date and the release would meet the later-priority demand to avoid excess allocation of supply.

When multiple supplies having different available-to-ship dates are allocated to the priority demand, then separate shipment recommendations are created based on the available-to-ship date.

After a minimum allocation duration time period, all the planned shipments are considered to be non-prioritized demand. Shipment recommendations may be created for post-minimum allocation duration time period planned shipments, in order of scheduled shipment date, until shipment recommendation duration time period.

At action 320, multi-level planning system pegs demand and supply based on constrained and unconstrained supplies, while respecting the demand prioritization rules. Supply and demand pegging generates a visibility map indicating supplies used across a multi-level distribution network to satisfy channel-level demands based on the independent priority of the demand at the originating location. As described above, GSDL module 208 generates supply and demand pegging information after calculate plan module 206 generates shipment recommendations.

To further explain the application of demand propagation in a multi-level supply chain network using Allocate by Independent Demand Priority (IDP) logic, several use cases are illustrated and described in connection with an exemplary multi-level supply chain network.

Figure 4:
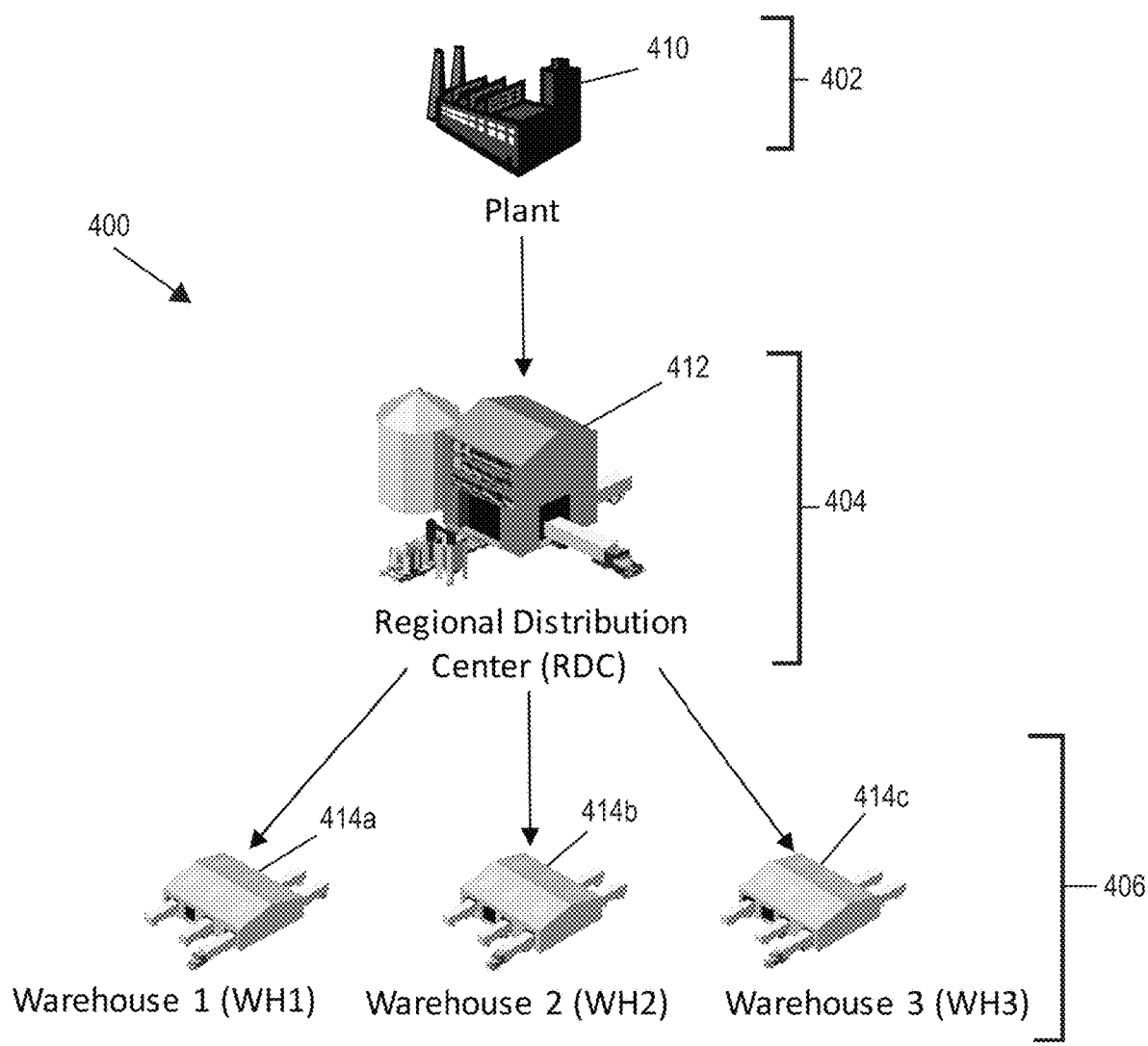
FIG. 4 illustrates an exemplary multi-level supply chain network, in accordance with an embodiment.

FIG. 4 illustrates exemplary multi-level supply chain network 400, in accordance with an embodiment. Multi-level supply chain network 400 comprises a series of nodes and edges arranged in a hierarchy of one or more levels, such as, for example, first level 402, second level 404, and third level 406. Nodes represent one or more supply chain entities having one or more demand types. Edges represent the movement of one or more items between the one or more supply chain entities. Although exemplary multi-level supply chain network 400 is illustrates as having three levels, embodiments contemplate a multi-level supply chain network having any number of two or more levels, such as, for example, three, four, five, or more levels arranged in a hierarchy. Although edges are described and illustrated as comprising a single direction of items transported from an upstream location to a downstream location, embodiments contemplate the transportation of one or more items upstream, downstream, and between nodes in the same level of hierarchy, according to particular needs.

In exemplary multi-level supply chain network 400, first level 402 comprises manufacturing plant 410. Second level 402 comprises regional distribution center 412. Third level 406 comprises first warehouse 414a, second warehouse 414b, and third warehouse 414c. Although exemplary multi-level supply chain network 400 is illustrated and described as comprising three levels, a single manufacturing plant 410; a single regional distribution center 412, and three warehouses 414a-414c, embodiments contemplate any number of manufacturing plants, regional distribution centers, warehouses, and/or one or more supply chain entities 150 at any level of a multi-level supply chain network, according to particular needs.

Shipment recommendations between upstream locations may be based on the priority of distribution demand and/or location priority, but without IDP logic, supply from manufacturing plant 410 would be routed to where supply is needed earlier, not where it is most important. According to embodiments lacking IDP logic, shipment recommendations would be created without visibility of the demand priority when allocating supply from manufacturing plant 410. In addition, without IDP logic, demand types (such as, for example, forecast demand, customer order demand, safety stock demand, etc.) and demand priority at downstream locations, where the demands generally originate, may not be taken into account for the shipment recommendations between upstream locations. For example, without IDP logic, shipment recommendations generated between manufacturing plant 410 and regional distribution center 412 are not created in consideration of the demand and priority of warehouses 414a-414c. These embodiments may also lack the capability to control the priority and allocation of safety stock, which may prevent, for example, prioritizing a safety stock of a higher priority customer over a forecast of a lower priority customer.

According to embodiments, a secondary shipment recommendation allocation rule 4 comprises an IDP logic that provides multi-level deployment functionality during a fulfillment process. Embodiments of multi-level planning system 110 using IDP logic allocate supply and create shipment recommendations based on the independent demand and location priority of a demand, creates just-in-time supplies for demands closest to their need date, while respecting independent priorities. As described in more detail below, prioritization may be made according to demand types (forecasted demand, customer orders, safety stock, and the like), demand sub-types (forecasted demand sub-type, customer order sub-type, and the like), and location. In addition, embodiments provides for configuration of safety stock priority, such as, for example, a safety stock priority greater than or less than customer orders, forecasted demand, and the like.

By way of explanation and not of limitation, a prioritization and supply process of the IDP logic is now described in connection with particular examples of multi-level deployment.

When calculating priority of demand using secondary shipment recommendation allocation rule 4, allocation strategy rules may be updated according to TABLE 1.

TABLE 1

| Demand Type | Priority | Sub-Priority | DmdSubType |
|---|---|---|---|
| 1 - AdjAllocTotFcst (Adjusted allocated total forecast) | 3 | 1 | 0 |
| 2 - FcstCustOrder (Forecasted customer order) | 2 | 1 | 0 |
| 3 - NonFcstCustOrder (Non forecasted customer order) | 1 | 1 | 0 |
| 5 - DepDmd (Dependent demand) | 5 | 1 | 0 |
| 6 - SuppOrder (Supplemental Order Demand) | 6 | 1 | 0 |
| 7 - Forced Supplemental orders | 7 | 1 | 0 |
| 9 - Safety Stock | 4 | 1 | 0 |

TABLE 1 illustrates demand types, priorities, sub-priorities, and demand sub-types, in accordance with an embodiment. Allocation strategy rules comprise one or more rules for deployment. For secondary shipment recommendation allocation rule 4, safety stock may be prioritized with respect to other demands. Demand sub-priority comprises the priority of a particular demand type in relation to all other demands that share the same allocation strategy priority. According to some embodiments, each individual order of customer orders and supplemental orders may be assigned a subpriority. In addition, shipment recommendation allocation rules govern how demands are prioritized by allocation strategy, demand type, dates and location, according to the following:

shipment recommendation allocation rule 1—sort demands, first, by location priority, second, by demand priority, and third, by needed shipment date;

shipment recommendation allocation rule 2—sort demands first, by location priority, second, by demand priority, and third, by needed arrival date.

shipment recommendation allocation rule 3—allocate by shipment date, then, sort demands, first, by demand priority, second, by location priority, and third, by needed shipment date; and shipment recommendation allocation rule 4—allocate by needed arrival date, then sort demands, first, by demand priority, second, by location priority, and third, by needed arrival date.

In a first example, IDP logic is described in connection with prioritizing customer orders of all customer over other demands. Continuing with this example, to meet customer orders from all customers prior to other demand types and prioritizing one customer over another customer, multi-level planning system 110 uses shipment recommendation allocation rule 3 and allocates by shipment date and sorts all demands by demand priority, followed by location priority, and then needed shipment data as illustrated in TABLES 2A-2B, where individual customer order individual priorities of are defined by sequence numbers 1, 2, 3, 4, 5, and 6 as per the priority of orders among various customers.

TABLE 2A

| Demand Type | Priority | Sub-Priority | Demand Subtype |
|---|---|---|---|
| 1 - Adjusted Allocated Total Forecast | 2 | 1 | 0 |
| 2 - Forecast Customer Orders | 1 | 1 | 0 |
| 3 - Non-Forecasted Customer Orders | 1 | 1 | 0 |
| 9 - Safety Stock | 3 | 1 | 0 |

TABLE 2B

| Location Priority | | Demand Priority (Allocation Strategy Table) | | |
|---|---|---|---|---|
| | | 2 Forecast | 1 Customer Order | 3 Safety Stock |
| 1 | Plant | 6 | 1 | 7 |
| 1 | RDC | 6 | 2 | 7 |
| 1 | WH1 | 6 | 3 | 7 |
| 1 | WH2 | 6 | 4 | 7 |
| 1 | WH3 | 6 | 5 | 7 |

TABLES 2A and 2B illustrate prioritization of demand, according to a first exemplary embodiment. According to the illustrated example, multi-level planning system 110 maintains an allocation strategy customer order as the first priority (i.e. sequence number 1) as compared with other demand types, while maintaining unique order priorities for customer orders at the manufacturing plant, regional distribution center, and the one or more warehouses. By way of more particular explanation and not of limitation, sequence number 1 indicates that customer orders of the manufacturing plant are met first, followed by customer orders of the regional distribution center (i.e. sequence number 2), first warehouse (i.e. sequence number 3), second warehouse (i.e. sequence number 4) and third warehouse (i.e. sequence number 5). After meeting all the customer orders, forecast (i.e. sequence number 6) of all locations are met based on demand date, followed by safety stock (i.e. sequence number 7) because the location priority is the same for all locations.

In a second example, IDP logic is described in connection with prioritizing orders of a first customer before orders of other customers and demand types. Continuing with this example, to meet customer orders of a first customer prior to customer orders of other customers and other demand types, multi-level planning system 110 uses shipment recommendation allocation rule 3 and allocates by shipment date and sorts all demands by demand priority, followed by location priority, and then needed shipment data as illustrated in TABLES 3A-3B, where individual customer order individual priorities of WH1 are defined as 1, 2, 3, 4 and 5.

TABLE 3A

| Demand Type | Priority | Sub-Priority | DmdSubType |
|---|---|---|---|
| 1 - AdjAllocTotFcst | 2 | 1 | 0 |
| 2 - FcstCustOrder | 1 | 1 | 0 |
| 3 - NonFcstCustOrder | 1 | 1 | 0 |
| 9 - Safety Stock | 3 | 1 | 0 |

TABLE 3B

| Loc Priority | | Demand Priority (Allocation Strategy) | | |
|---|---|---|---|---|
| | | 2 Forecast | 1 Customer Order | 3 Safety Stock |
| 1 | Plant | 7 | 6 | 8 |
| 1 | RDC | 7 | 6 | 8 |
| 1 | WH1 | 7 | 1, 2, 3, 4, 5 | 8 |
| 1 | WH2 | 7 | 6 | 8 |
| 1 | WH3 | 7 | 6 | 8 |

TABLES 3A and 3B illustrate prioritization of demand, according to a second exemplary embodiment. According to the illustrated example, multi-level planning system 110 maintains individual order priorities only for customer orders of first warehouse, so that all first warehouse customer orders (i.e. sequence numbers 1, 2, 3, 4, and 5) are met first, followed by the customer orders of the manufacturing plant, regional distribution center, second warehouse and third warehouse by demand date. After meeting all customer orders, forecast (i.e. sequence number 7) at all locations are met based on demand date, followed by safety stock (i.e. sequence number 8) because the location priority is the same for all locations.

In a third example, IDP logic is described in connection with prioritizing and mixing customer orders and forecast orders. Continuing with this example, to process some customer orders at a higher priority than forecast orders and process some customer orders processed at a lower priority than forecast orders, multi-level planning system 110 uses shipment recommendation allocation rule 3 and allocates by shipment date and sorts all demands by demand priority, followed by location priority, and then needed shipment data as illustrated in TABLES 4A-4B, where individual customer order individual priorities are defined as 1, 2, 3, 5 and 6.

TABLE 4A

| Demand Type | Priority | Sub-Priority | DmdSubType |
|---|---|---|---|
| 1 - AdjAllocTotFcst | 1 | 4 | 0 |
| 2 - FcstCustOrder | 1 | 1 | 0 |
| 3 - NonFcstCustOrder | 1 | 1 | 0 |
| 9 - Safety Stock | 2 | 1 | 0 |

TABLE 4B

| Loc Priority | | Demand Priority (AllocStrat) | | |
|---|---|---|---|---|
| | | 1 Forecast | 1 Customer Order | 2 Safety Stock |
| 1 | Plant | 4 | 1 | 7 |
| 1 | RDC | 4 | 2 | 7 |
| 1 | WH1 | 4 | 3 | 7 |
| 1 | WH2 | 4 | 5 | 7 |
| 1 | WH3 | 4 | 6 | 7 |

TABLES 4A and 4B illustrate prioritization of demand, according to a third exemplary embodiment. According to the illustrated example, customer orders of manufacturing Plant (i.e. sequence number 1), RDC (i.e. sequence number 2) and WH1 (i.e. sequence number 3) are processed first in sequence, followed by forecast demand (i.e. sequence number 4) based on demand date. Next, customer orders of WH2 (i.e. sequence number 5) and WH3 (i.e. sequence number 6) are processed followed, lastly, by safety stock (i.e. sequence number 7).

In a fourth example, IDP logic is described in connection with prioritizing demands of a first customer prior to demands of other customers by demand type. Continuing with this example, to satisfy all demands of a particular customer, based on demand type, prior to demands of other customers, multi-level planning system 110 uses shipment recommendations allocation rule 1 and sorts all demands by location priority, followed by demand priority, and then needed shipment date, as illustrated in TABLES 5A-5B.

TABLE 5A

| Demand Type | Priority | Sub-Priority | DmdSubType |
|---|---|---|---|
| 1 - AdjAllocTotFcst | 2 | 1 | 0 |
| 2 - FcstCustOrder | 1 | 1 | 0 |
| 9 - Safety Stock | 3 | 1 | 0 |

TABLE 5B

| | | Demand Priority (AllocStrat) | | |
|---|---|---|---|---|
| Loc Priority | | 2 Forecast | 1 Customer Order | 3 Safety Stock |
| 1 | Plant | 2 | 1 | 3 |
| 2 | RDC | 5 | 4 | 6 |
| 3 | WH1 | 8 | 7 | 9 |
| 4 | WH2 | 11 | 10 | 12 |
| 5 | WH3 | 14 | 13 | 15 |

TABLES 5A and 5B illustrate prioritization of demand, according to a fourth exemplary embodiment. According to the illustrated example, all demands (i.e. sequence numbers 1, 2 and 3) at a manufacturing plant are satisfied first based on a demand date before those of the regional distribution center and followed, lastly, by the warehouses (WH1, WH2, and WH3).

In a fifth example, IDP logic is described in connection with prioritizing demands of a first ahead of other customers by a demand date. Continuing with this example, to prioritize all demands of a particular customer prior to all demands of other customers subject to a particular demand date, multi-level planning system 110 uses shipment recommendations allocation rule 1 and sorts all demands by location priority, followed by demand priority, and then needed shipment date, as illustrated in TABLES 6A-6B.

TABLE 6A

| Demand Type | Priority | Sub-Priority | DmdSubType |
|---|---|---|---|
| 1 - AdjAllocTotFcst | 1 | 1 | 0 |
| 2 - FcstCustOrder | 1 | 1 | 0 |
| 9 - Safety Stock | 1 | 1 | 0 |

TABLE 6B

| | | Demand Priority (Allocation Strategy) | | |
|---|---|---|---|---|
| Location Priority | | 1 Forecast | 1 Customer Order | 1 Safety Stock |
| 1 | Plant | 1 | 1 | 1 |
| 2 | RDC | 2 | 2 | 2 |
| 3 | WH1 | 3 | 3 | 3 |
| 4 | WH2 | 4 | 4 | 4 |
| 5 | WH3 | 5 | 5 | 5 |

TABLES 6A and 6B illustrate prioritization of demand, according to a fifth exemplary embodiment. According to the illustrated example, all demands (i.e. sequence numbers 1, 2 and 3) at a manufacturing plant are satisfied first based on a demand date before those of the regional distribution center and followed, lastly, by the warehouses (WH1, WH2, and WH3).

In a sixth example, IDP logic is described in connection with prioritizing forecasts and customer orders by sub-type. Continuing with this example, to prioritize forecast and customer order based, at least in part, on SubType, multi-level planning system 110 processes base forecasts prior to any non-base forecasts and all base customer orders prior to any non-base customer order using shipment recommendation allocation rule 3 and allocates by shipment date and sorts all demands by demand priority, followed by location priority, and then needed shipment data as illustrated in TABLES 7A-7B.

TABLE 7A

| Demand Type | Priority | Sub-Priority | DmdSubType |
|---|---|---|---|
| 1 - AdjAllocTotFcst | 1 | 1 | 1 - Base |
| 1 - AdjAllocTotFcst | 2 | 1 | 2-Market Activity |
| 2 - FcstCustOrder | 3 | 1 | 1 - Base |
| 2 - FcstCustOrder | 4 | 1 | 2- Market Activity |
| 9 -SafetyStock | 5 | 1 | 0 |

TABLE 7B

| | | Demand Priority (Allocation Strategy by SubType) | | |
|---|---|---|---|---|
| Location Priority | | 1, 2 Forecast | 3, 4 Customer Order | 5 Safety Stock |
| 1 | Plant | 1, 2 | 3, 4 | 5 |
| 1 | RDC | 1, 2 | 3, 4 | 5 |
| 1 | WH1 | 1, 2 | 3, 4 | 5 |
| 1 | WH2 | 1, 2 | 3, 4 | 5 |
| 1 | WH3 | 1, 2 | 3, 4 | 5 |

TABLES 7A and 7B illustrate prioritization of demand, according to a sixth exemplary embodiment. The sequence numbers 1, 2 indicate that base forecasts are processed first followed by non-base forecasts, the sequence numbers 3, 4 indicate the base customer orders are processed followed by non-base customer orders. The sequence number 5 indicates that safety stocks are processed last.

According to embodiments, one or more additional constraints may be used to enforce prioritization of demands, according to particular needs. For example, forecast and safety stock may be set as instantaneous demand and bucketed based on an ultimate source calculated shipment recommendation.

Ultimate source allocation strategy table is used to prioritize and propagate all the independent demand within the minimum allocation duration time period to ensure the same demand type prioritization across multi-level supply chain network 400.

Ultimate source minimum allocation duration time period is used to prioritize the demand within a specified duration time period across multi-level supply chain network 400 so that all demands which fall within an ultimate source minimum allocation duration time period are prioritized and met.

The shipment recommendation duration time period for an ultimate source SKU may be used as shipment recommendation duration time period for the supply chain network. When shipment recommendation duration time period for an ultimate source SKU is not available, then a planned process shipment recommendation duration time period is used.

When secondary shipment recommendation allocation rule 4 is used with date sensitive inventory, then multi-level planning system 110 uses secondary shipment recommendation allocation rule 1.

When secondary shipment recommendation allocation rule 4 is used with flow through, then multi-level planning system 110 runs flow-through according to secondary shipment recommendation allocation rule 2 and a corresponding exception is raised.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method of multi-level replenishment planning and execution with independent channel demand prioritization by a server, comprising:
    producing a product by a first supply chain entity, wherein the first supply chain entity receives orders for the product from a second supply chain entity and supplies the product to a third supply chain entity, wherein the third supply chain entity receives orders for the product from a fourth supply chain entity, and the first supply chain entity, the second supply chain entity, the third supply chain entity, and the fourth supply chain entity are different supply chain entities in a multi-level supply chain network;
    scanning, by one or more imaging devices, an identifier associated with the product;
    generating, by the one or more imaging devices, a mapping of the product in the multi-level supply chain network, wherein the one or more imaging devices automatically identify when the product is received into or removed from one or more stocking locations;
    calculating, using a calculate plan module, a supply of the product for the first supply chain entity for a supply allocation duration time period;
    receiving, using a calculate dynamic demand response module, demand orders for the product from the second supply chain entity and the fourth supply chain entity for at least the supply allocation duration time period, wherein the priority of the orders for the fourth supply chain entity are a higher priority than the orders for the second supply chain entity;
    allocating, using a generate supply and demand links module, supplies within the supply allocation duration time period to firm plan arrivals based on a location priority and a demand date for the supply of the product;
    generating, using the calculate plan module, a shipment recommendation for each allocated supply of the product that meets a firmed planned arrival; and
    transporting, autonomously by instructing automated machinery, the product among one or more supply chain entities according to the shipment recommendation to resupply an inventory of the third supply chain entity with the product to meet the order for the product for the fourth supply chain entity.

2. The computer-implemented method of claim 1, further comprising:
    meeting priority demands within a minimum allocation duration time period after reserving supplies for a hold back quantity and one or more outbound in-transits and allocating against the firm planned arrivals.

3. The computer-implemented method of claim 2, further comprising:
    create one or more separate shipment recommendations based on an available-to-ship date when multiple supplies having different available-to-ship dates are allocated to a priority demand.

4. The computer-implemented model of claim 3, further comprising:
    receiving a demand forecasting unit-level demand forecast; and
    converting the demand forecasting unit-level demand forecast to a stock keeping unit-level demand forecast.

5. The computer-implemented model of claim 4, further comprising:
    generating linkages across a supply chain network that map demand orders from the fourth supply chain entity to the supply of the first supply chain entity.

6. The computer-implemented model of claim 5, further comprising:
    generating one or more SKU-level planned arrivals to meet demand requirements of different channels by respecting SKU planning parameters and constraints.

7. The computer-implemented model of claim 6, further comprising:
    calculating a safety stock for the first supply chain entity and the third supply chain entity to meet the demands of the second supply chain entity and the fourth supply chain entity.

8. A system of multi-level replenishment planning and execution with independent channel demand prioritization, comprising:
    a system architecture having a calculate plan module, a calculate dynamic demand response (DDR) module, a generate supply and demand links (GSDL) module and a server;
    the server, comprising one or more processors and memory, and configured to:
        scan, by one or more imaging devices, an identifier associated with a product;
        generate, by the one or more imaging devices, a mapping of the product in a multi-level supply chain network, wherein the one or more imaging devices automatically identify when the product is received into or removed from one or more stocking locations;
        calculate, using a calculate plan module, a supply of the product for a first supply chain entity for a supply allocation duration time period, wherein the first supply chain entity receives orders for the product from a second supply chain entity and supplies the product to a third supply chain entity, wherein the third supply chain entity receives orders for the product from a fourth supply chain entity, and the first supply chain entity, the second supply chain entity, the third supply chain entity, and the fourth supply chain entity are different supply chain entities in the multi-level supply chain network;
        receive, using a calculate DDR module, demand orders for the product from the second supply chain entity and the fourth supply chain entity for at least the supply allocation duration time period, wherein the priority of the orders for the fourth supply chain entity are a higher priority than the orders for the second supply chain entity;

allocate, using the GSDL module, supplies within the supply allocation duration time period to firm plan arrivals based on a location priority and a demand date for the supply of the product;

generate, using the calculate plan module, a shipment recommendation for each allocated supply of the product that meets a firmed planned arrival; and initiate, autonomously by instructing automated machinery, the transportation of the product among one or more supply chain entities according to the shipment recommendation to resupply an inventory of the third supply chain entity with the product to meet the order for the product for the fourth supply chain entity.

9. The system of claim 8, wherein the server is further configured to:

meet priority demands within a minimum allocation duration time period after reserving supplies for a hold back quantity and one or more outbound in-transits and allocating against the firm planned arrivals.

10. The system of claim 9, wherein the server is further configured to:

create one or more separate shipment recommendations based on an available-to-ship date when multiple supplies having different available-to-ship dates are allocated to a priority demand.

11. The system of claim 10, wherein the server is further configured to:

receive a demand forecasting unit-level demand forecast; and convert the demand forecasting unit-level demand forecast to a stock keeping unit-level demand forecast.

12. The system of claim 11, wherein the server is further configured to:

generate linkages across a supply chain network that map demand orders from the fourth supply chain entity to the supply of the first supply chain entity.

13. The system of claim 12, wherein the server is further configured to:

generate one or more SKU-level planned arrivals to meet demand requirements of different channels by respecting SKU planning parameters and constraints.

14. The system of claim 13, wherein the server is further configured to:

calculate a safety stock for the first supply chain entity and the third supply chain entity to meet the demands of the second supply chain entity and the fourth supply chain entity.

15. A non-transitory computer-readable medium embodied with multi-level replenishment planning and execution with independent channel demand prioritization software, the software when executed by a server, the server comprising a processor and memory:

scans, by one or more imaging devices, an identifier associated with a product;

generates, by the one or more imaging devices, a mapping of the product in a multi-level supply chain network, wherein the one or more imaging devices automatically identify when the product is received into or removed from one or more stocking locations;

calculates, using a calculate plan module, a supply of the product for a first supply chain entity for a supply allocation duration time period, wherein the first supply chain entity receives orders for the product from a second supply chain entity and supplies the product to a third supply chain entity, wherein the third supply chain entity receives orders for the product from a fourth supply chain entity, and the first supply chain entity, the second supply chain entity, the third supply chain entity, and the fourth supply chain entity are different supply chain entities in the multi-level supply chain network;

receives, using a calculate dynamic demand response module, demand orders for the product from the second supply chain entity and the fourth supply chain entity for at least the supply allocation duration time period, wherein the priority of the orders for the fourth supply chain entity are a higher priority than the orders for the second supply chain entity;

allocates, using a generate supply and demand links module, supplies within the supply allocation duration time period to firm plan arrivals based on a location priority and a demand date for the supply of the product;

generates, using the calculate plan module, a shipment recommendation for each allocated supply of the product that meets a firmed planned arrival; and initiates, autonomously by instructing automated machinery, the transportation of the product among one or more supply chain entities according to the shipment recommendation to resupply an inventory of the third supply chain entity with the product to meet the order for the product for the fourth supply chain entity.

16. The non-transitory computer-readable medium of claim 15, wherein the software when executed further:

meets priority demands within a minimum allocation duration time period after reserving supplies for a hold back quantity and one or more outbound in-transits and allocating against the firm planned arrivals.

17. The non-transitory computer-readable medium of claim 16, wherein the software when executed further:

creates one or more separate shipment recommendations based on an available-to-ship date when multiple supplies having different available-to-ship dates are allocated to a priority demand.

18. The non-transitory computer-readable medium of claim 17, wherein the software when executed further:

receives a demand forecasting unit-level demand forecast; and converts the demand forecasting unit-level demand forecast to a stock keeping unit-level demand forecast.

19. The non-transitory computer-readable medium of claim 18, wherein the software when executed further:

generates linkages across a supply chain network that map demand orders from the fourth supply chain entity to the supply of the first supply chain entity.

20. The non-transitory computer-readable medium of claim 19, wherein the software when executed further:

generates one or more SKU-level planned arrivals to meet demand requirements of different channels by respecting SKU planning parameters and constraints.

* * * * *